Patented Apr. 13, 1943

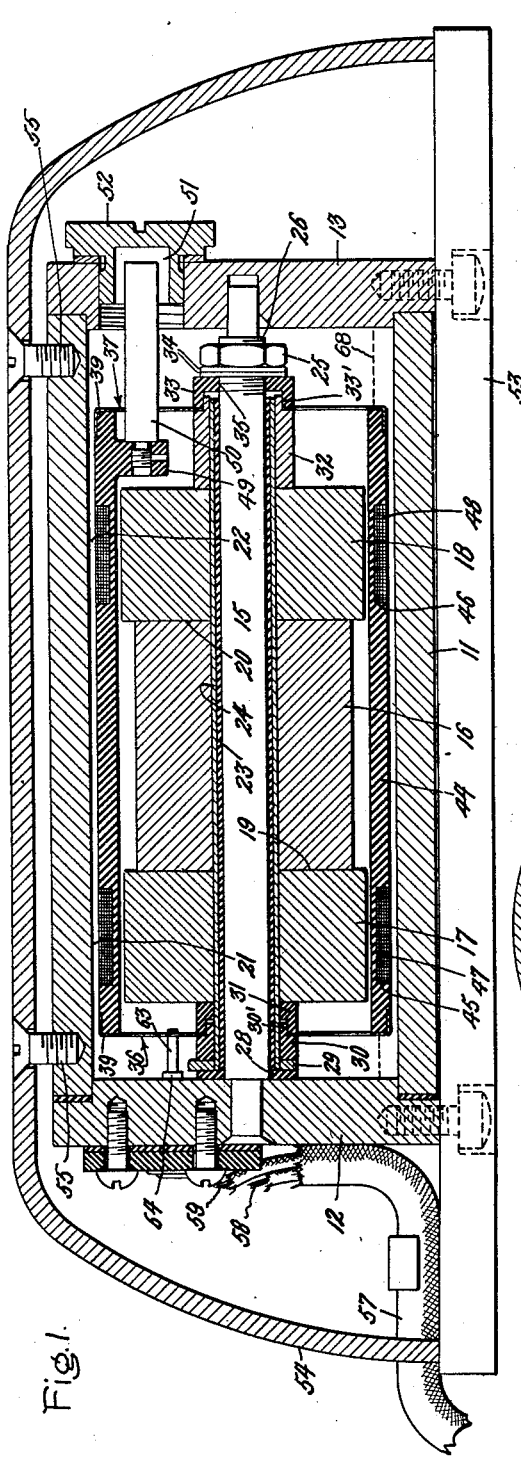
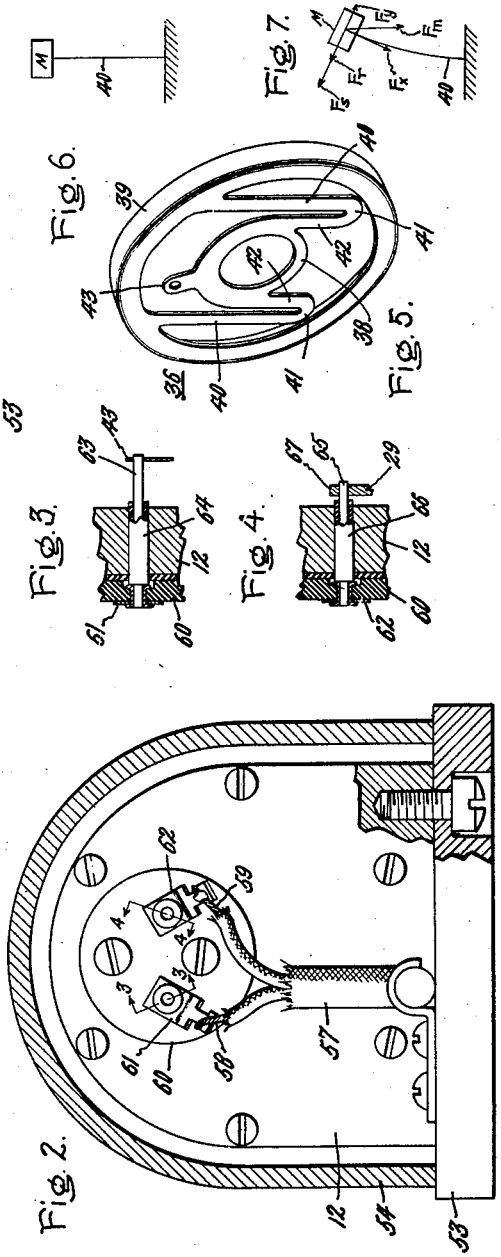

2,316,616

UNITED STATES PATENT OFFICE 2,316,616

VIBRATION RESPONSIVE DEVICE

Frederic K. Powell, Schenectady, N. Y., assignor to General Electric Company, a corporation of New York Application February 11, 1942, Serial No. 430,407

5 Claims. (Cl. 171—209)

My invention relates to vibration responsive devices and concerns particularly low frequency electromagnetic vibration velocity units.

It is an object of my invention to provide an improved, compact, sturdy, totally enclosed and efficient vibration measuring instrument which may be secured to a vibrating body and which produces a voltage proportional to vibration velocity which may be read on a voltmeter.

Another object of my invention is to provide a suspension for one of the relatively movable elements of the device which has adequate strength but nevertheless produces a sufficiently small effective restoring force to give the unit a relatively low natural frequency of vibration.

Other and further objects and advantages will become apparent as the description proceeds.

In carrying out my invention in its preferred form I provide a steel shell with a center rod supporting a permanent magnet assembly with a circular cross-section so as to provide annular air gaps. I also provide electrical coils adapted to be mounted in the air gap supported by a resilient suspension including column springs in order to provide a relatively small restoring force and a relatively low natural frequency of vibration. The vibration velocity unit is an improvement over those described in Patents No. 2,067,803, Thearle, and No. 2,082,646, Meade.

A better understanding of the invention will be afforded by the following detailed description considered in connection with the accompanying drawing and those features of the invention which are believed to be novel and patentable will be pointed out in the claims appended hereto.

In the drawing Fig. 1 is a longitudinal sectional view of one embodiment of my invention; Fig. 2 is an end view of the unit with an enclosing casing shown in section; Fig. 3 is a detailed view in section of a portion of the apparatus shown as cut by a plane 3—3 in Fig. 2; Fig. 4 is a similar section shown as cut by a plane 4—4 in Fig. 2; Fig. 5 is a perspective view of one of the improved suspensions utilized for supporting the electric winding assembly shown in Fig. 1, and Figs. 6 and 7 are schematic diagrams illustrating the principle involved in the use of a column spring as provided by the suspension illustrated in Fig. 5. Like reference characters are utilized throughout the drawing to designate like parts.

The vibration velocity unit illustrated in the drawing comprises a pair of relatively movable elements which may for convenience be referred to as the magnetic field structure and the electric winding structure. The magnetic field structure comprises a cylindrical shell 11 composed of steel or other magnetizable material with end plates 12 and 13 which may also be of steel and a center rod 15 which may be composed of brass, for example, rigidly secured to the end plates 12 and 13 for supporting a permanent magnet assembly. The rod 15 is shown as attached to the end plate 12 by a drive fit into an opening therein or by peaning over the end of the rod. The right-hand end of the rod 15 may have a slip fit in an opening of the end plate 13 and is used as a guide to center assembly on rod 15.

The magnet assembly comprises a hollow cylindrical permanent magnet 16 surrounding the rod 15 and magnetized axially with respect to the cylinder axis, and a pair of pole pieces 17 and 18 also cylindrical in shape with center openings for the rod 15, mounted abutting the ends or pole faces 19 and 20 of the permanent magnet 16 and preferably slightly greater in diameter than the permanent magnet 16 but less in diameter than the internal diameter of the shell 11 in order to provide a pair of annular air gaps 21 and 22 for receiving current-conducting electrical windings. The shell 11 and the pole pieces 17 and 18 are shown with surfaces that are right circular cylinders and this is most convenient from the standpoint of manufacture. However my invention is not limited thereto and includes any shape of surface generated by elements parallel to an axis of reference.

The magnet 16 and the pole pieces 17 and 18 have center openings of appropriate size to provide a good fit around the center rod 15 with two concentric tubular sleeves interposed around the rod 15, viz: an insulating sleeve 23 composed of a suitable insulating material such as pressboard and a conducting sleeve 24 composed of a suitable electrically conducting material such as brass or copper. The magnet assembly is fixed in axial position on the center rod 15 by means of a nut 25 engaging a threaded portion 26 of the center rod 15 and a plurality of insulating and conducting spacer members on the rod 15 as follows: An insulating washer 28, a conducting washer 29 which makes electrical contact with the conducting tubular sleeve 24, a nonconducting bushing and spacer 30, a nonconducting bushing and spacer 31, an electrically conducting spacer and bushing 32, which makes electrical contact with the tubular sleeve 24, and insulating spacer and bushing 33 and, if desired, lock washers 34. The spacers 30 and 31 are provided with interfitting shoulders 30' as shown, and likewise the spacers 33 and 34 are provided with interfitting shoulders 33' as shown. The spacer 33 also has an internal diameter portion 35 fitting the center rod 15.

For mounting the electrical winding structure a pair of suspensions 36 and 37 of the type illustrated in Fig. 5 is provided. Each of these suspensions includes a center ring portion 38 which fits the spacer 30 or the spacer 32 and is clamped for support between the spacers 30 and 31 at the left-hand end of the rod 15 or the spacers 32 and 33 at the right end of the rod 15. The suspensions 36 and 37 also have outer ring portions 39 for attachment to the electrical winding structure and are used to conduct the generated current.

The center ring portion 38 and the outer ring portion 39 of each suspension 36 or 37 are mechanically connected by portions forming a W-shaped spring consisting of a pair of relatively long upright portions 40 serving as column springs joined at their upper ends to the outer ring portion 39 and joined at their lower ends by yoke portions 41 to relatively short upright portions 42, which are joined at their upper ends to the center ring portion 38 of the suspension 36 or 37. The suspension 36 at the left-hand end of the rod 15 also has an electrical connecting lug 43 joined to the center ring portion 38 but such a lug is not necessary, for reasons which will become apparent, in the suspension 37 at the right-hand end of the rod 15. In the arrangement shown, the portions 38, 40, 41, 42 and 43 of the suspensions 36 or 37 are flat and the outer ring portion 39 is flanged. Preferably for the sake of economy in manufacture and reliability in use all of the portions of the suspension 36 or 37, as shown in Fig. 5, are formed from an integral piece of metal, such as phosphor bronze, for example, which is electrically conducting and mechanically resilient.

The current-conducting winding structure comprises a winding form 44 composed of insulating material such as a molded phenolic condensation product, e. g., or a compressed fabric impregnated with a phenolic condensation product and molded under pressure. The winding form 44 is tubular and the ends thereof are arranged to fit within the flanged outer ring portions 39 of the suspensions 36 and 37. Annular grooves 45 and 46 are formed in the insulating tube 44 at the locations of the air gaps 21 and 22 for receiving current-conducting windings or voltage pick-up coils 47 and 48. For checking the position of the electrical winding structure a lug 49 extending inwardly may be formed in the insulating tube 44 and a checking pin 50 may be threaded into the lug 49 and allowed to extend through an opening 51 which may be provided in the right-hand end plate 13. If desired the opening 51 and the end of the checking pin 50 may normally be covered by providing a removable plug 52.

For supporting the unit and to facilitate attachment to a vibrating body, the vibration of which is to be measured, a base plate 53 may be provided which is screwed to the end plates 12 and 13 to form the base 53 and the magnetic field structure into a rigid mechanized unit.

For the protection of the vibration responsive unit and exclusion of dust, an enclosing shell or casing 54 composed of a casting or spun sheet metal may be provided. As shown this is clamped against the base plate 53 by removable screws 55 threaded into the steel shell 11.

For the purpose of making electrical connection between the voltage pick-up coils 47 and 48 and a voltage responsive electrical instrument (not shown) a cable 57 is provided containing a pair of insulated conductors 58 and 59, and a connection block 60 composed of insulating material may be secured to the end plate 12. Connecting lugs 61 and 62 are provided on the block 60 for connection to the conductors 58 and 59, respectively, as shown in Fig. 2. As illustrated in Figs. 2 and 3 the connecting lug 61 is electrically connected to a conducting pin 63, passing through the end plate 12 and insulated therefrom by an insulating bushing 64. The inner end of the conducting pin 63 is electrically connected to the lug 43 of the suspension 36 shown in Fig. 5.

As shown in Figs. 2 and 4 the connecting lug 62 of the connection block 60 also has electrically connected thereto a conducting pin 65, which passes through the end plate 12 and is insulated therefrom by an insulating bushing 66, and the inner end of the conducting pin 65 is electrically connected to the conducting washer 29 which has a suitable radially-extending connection lug 67 formed thereon. Electrical connections, not visible in the drawing, in the form of fine wire are made between the outer ring portion 39 of the left-hand suspension 36 and one end of the coil 47; also between the remaining end of the coil 47 and one end of the coil 48; also between the remaining end of the coil 48 and the outer flanged ring portion 39 of the right-hand suspension 37. Thus an electrical circuit is completed from one conductor 58 through the connection lug 61, the conducting pin 63, the suspension 36, the coil 47, the coil 48, the suspension 37, the metallic spacer 32, the metallic sleeve 24, the metallic washer 29, the conducting pin 65, the connecting lug 62, and the conductor 59. The coils are connected so that their voltages add. It will be understood that the opposite ends of the conductors 58 and 59 are connected to the terminals of an alternating current voltage responsive instrument (not shown).

The form of W-shaped spring suspension illustrated in Fig. 5 is not limited to use in such construction as illustrated in Fig. 1 and my invention is not limited to the precise shape and proportions of parts illustrated in Fig. 5, nor to the precise manner of mounting described. If the body to be suspended were attached to the center ring 38 and the suspension were to be supported from the outer ring 39, the suspension as shown in Fig. 5 would be turned upside down in order to obtain the column spring effect of the upright members 40.

Fluid damping may be provided between the shell 11 and coil form 44 by placing a small amount of damping fluid 68 in the shell 11, e. g., one-half to one ounce of SAE 30 motor oil.

In order to utilize the vibration velocity unit for measuring the vibration velocity of a vibrating body, the unit is secured to the vibrating body by attaching the base plate 53 to it. For example, the base plate 53 may be secured by screws or clamps (not shown) to a cap of a turbine bearing (not shown) in order to obtain a measurement of the bearing vibration. The base plate 53 and consequently the entire housing of the vibration velocity unit and the magnetic field structure vibrate with the vibrating body. The electrical winding structure, however, stands relatively still in space owing to its resilient suspension. Since the voltage pick-up coils 47 and 48 stand still whereas the pole pieces 17 and 18 of the magnet 16 and the magnetic shell 11 vibrate the magnetic flux lines produced by the magnet 16 across the air gaps 21 and 22 will cut the conductors of the pick-up coils 47 and 48 with a velocity proportional to the vibration of velocity being measured. The voltage responsive instrument connected to the conductors 58 and 59 will therefore give an indication of the vibration velocity.

For the electrical winding structure to stand still when the housing is being vibrated it is necessary, however, for the natural period of vibration of the relatively movable elements to be relatively low in comparison with the frequency of vibration to be measured. The natural period of vibration of resiliently supported parts is a function of the mass of the moving part and the spring stiffness of the resilient supporting connection, being a direct function of the spring stiffness and an inverse function of the mass. In order to obtain a low natural frequency of vibration, therefore, the ratio of spring stiffness to mass must be relatively small. The low spring stiffness may be obtained by a very long or a very weak spring. Neither of these conditions is feasible, however, in a device which must be compact and be able to withstand rough usage. In order to have the equivalent of a weak spring but with small dimensions and strong enough to be sturdy and to support the electrical winding structure, I utilize a spring suspension such as illustrated in Fig. 5 in which a column spring member is utilized in order to introduce negative restoring force. The manner in which negative restoring force is obtained from the column spring portions 40 of the suspensions 36 and 37 is illustrated in Figs. 6 and 7.

The restoring force produced by the stiffness of the spring portion 40 considered alone would be great enough to produce a relatively high frequency of vibration. However, a portion of this restoring force is overcome by the force of gravity acting on the electrical winding structure represented in Figs. 6 and 7 by the mass M. As shown in Fig. 7 the force of gravity acting on the mass M tends to bend the spring 40 and the further the spring 40 is deflected by the action of vibration the greater the component of the force of gravity tending to bend the spring 40. In Fig. 7 the restoring force caused by the spring stiffness is represented by the vector $F_s$. The force of gravity acting downwardly is represented by the vector $F_m$ and the components of the force $F_m$ are the component $F_x$ acting longitudinally on the spring 40 and the component $F_y$ acting at right angles to the end of the spring 40 and therefore parallel to the restoring force $F_s$. The component $F_y$ acts in the opposite direction, however, from the restoring force $F_s$ and is slightly smaller than the force $F_s$. The resultant restoring force $F_r$ is therefore the restoring force acting upon the electric winding structure which is effective in determining its natural frequency of vibration. Since the force $F_s$ and $F_y$ both increase as relative displacement takes place between the electric winding structure and the magnetic field structure, the resultant restoring force $F_r$ also increases as such displacement takes place and a stable condition is produced in which the electric winding structure stands still in space while the base plate 53 with the remainder of the velocity unit is vibrating. The W-shaped spring suspensions 36 and 37 have the effect of great spring stiffness transverse pick-up coil axis for supporting the electrical winding structure and exceedingly little spring stiffness parallel to the coil axis for giving a low natural frequency of vibration.

The correctness of the initial position of the electrical winding structure with respect to the steel shell 11 may be checked by removing the casing 54 and the plug 52 and observing the alignment of the end of the check pin 50 with the outside surface of the end plate 13. The length of the check pin 50 is made such that the end thereof is flush with the outer surface of the plate 13 when the positioning of the electric winding structure is correct.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A vibration velocity responsive device comprising a shell of magnetizable material with a substantially cylindrical inner surface, a substantially concentric center rod mounted in the shell, a permanent magnet unit mounted on said center rod with substantially cylindrical pole pieces having cylindrical surfaces spaced from the inner surface of said shell to form a pair of annular air gaps, an electrical winding structure including a pair of current-conducting coils within said air gaps and a resilient mounting for said winding structure providing stiffness with respect to transverse motion and resilience with respect to relative axial motion between the electrical winding structure and the permanent magnet pole pieces.

2. A vibration responsive device comprising a magnetic field structure having an annular air gap therein, an electrical winding structure, supporting members coaxially located in said magnetic field structure and secured thereto, and resilient suspensions for the electrical winding structure, said electrical winding structure comprising a substantially cylindrical coil form passing through said air gaps, a current-conducting coil mounted in said coil form within said air gap, and the suspensions comprising W-shaped springs joined to center and outer rings, the inner rings being secured to the said supporting members and the outer rings being secured to said coil form, said W-shaped springs comprising relatively long upright column spring portions joined at the upper ends to said outer rings, relatively short upright portions joined at their upper ends to said center rings, and yoke portions each joining the lower end of one relatively short upright portion to the lower end of one of said column spring portions.

3. A low-effective-restoring-force suspension for a vibration responsive device comprising a W-shaped spring with a center ring portion for attachment to a supporting member and an outer ring portion for attachment to a member to be supported, said W-shaped spring including a pair of upright column spring portions of relatively great length but of less length than the diameter of said outer ring portion, a pair of yoke portions, and relatively short upright portions, the latter being joined at their upper ends to said center ring portion, each of said yoke portions joining the lower end of one column spring portion and the lower end of one of said relatively short upright portions, and the upper ends of the column spring portion being joined to said outer rings.

4. A low-effective-restoring-force suspension for a vibration responsive device comprising a substantially W-shaped spring with a pair of upper ends for attachment to a member to be supported, and a pair of center ends for attachment to a supporting member, said W-shaped spring comprising a pair of relatively upright portions, the upper ends of which form the said upper ends of the W-shaped spring, a pair of relatively short upright portions the upper ends of which form the said center ends of the W-shaped spring and a pair of yoke portions, each yoke portion being joined to the lower end of one of said relatively long upright portions and the lower end of said relatively short upright portions.

5. An electrical winding structure and mounting for a vibration responsive device comprising a substantially cylindrical winding form, a supporting center rod with first and second ends, an insulating tube surrounding the center rod, a conducting tube surrounding the said insulating tube, a first suspension at the first end of said rod, attached thereto and secured to one end of said winding form, insulated from said rod and electrically connected to said conducting tube, a second suspension at the second end of said rod, mechanically connected thereto but insulated therefrom and secured to the other end of said winding form, a conducting washer connected electrically to the said second end of said conducting tube, an electrical winding mounted in said winding form electrically connected between said suspensions, and a pair of electrical terminals connected to said conducting washer and to said second suspension.

FREDERIC K. POWELL.